(No Model.) 7 Sheets—Sheet 1.
J. B. G. A. CANET & A. HILLAIRET.
CONTROLLING APPARATUS FOR ELECTROMOTORS.
No. 550,481. Patented Nov. 26, 1895.
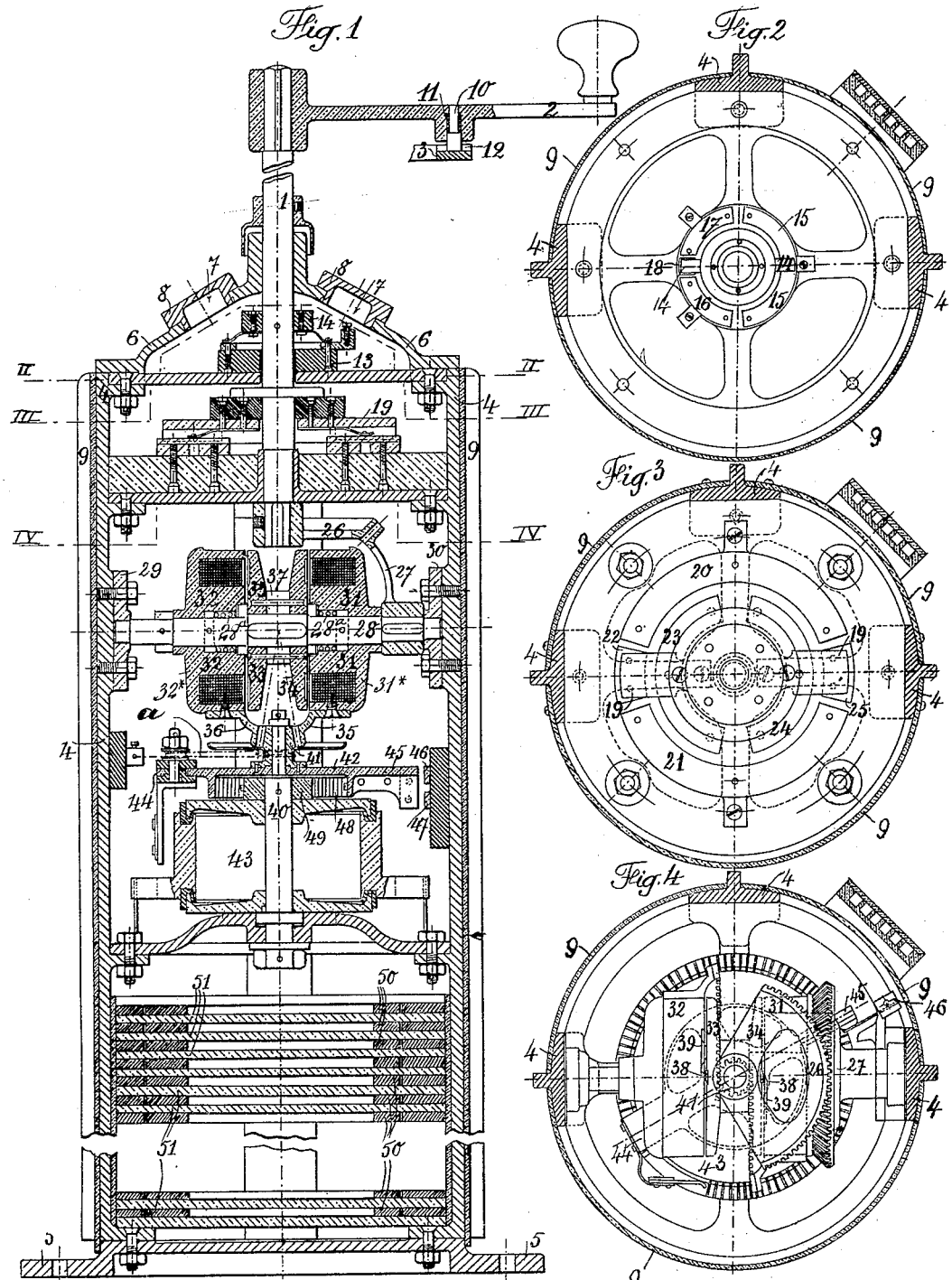
Witnesses.
C. M. Werle
Hubert E. Bok
Inventors
J. B. G. A. Canet
André Hillairet

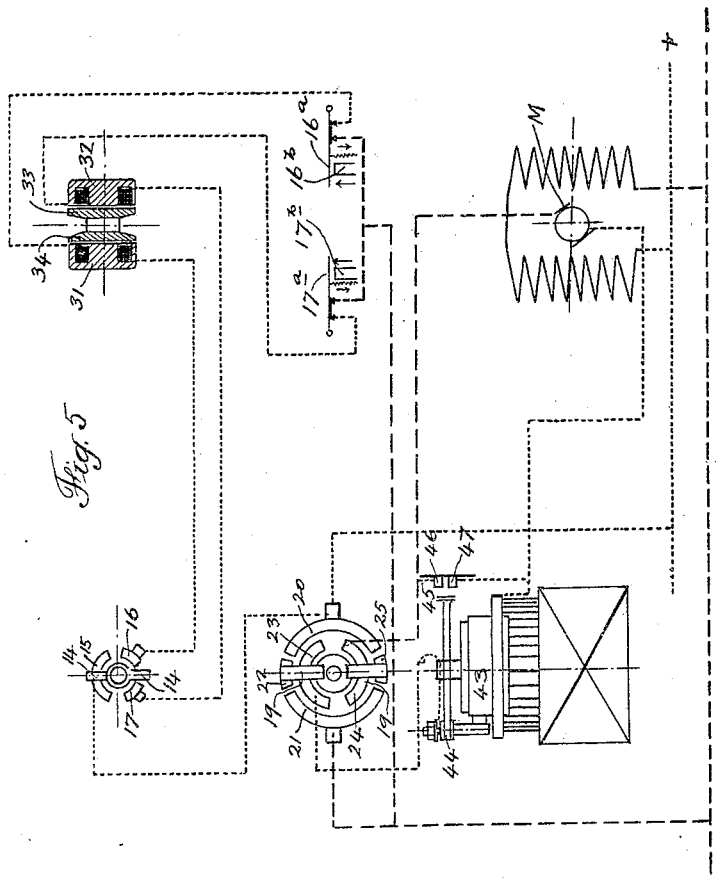

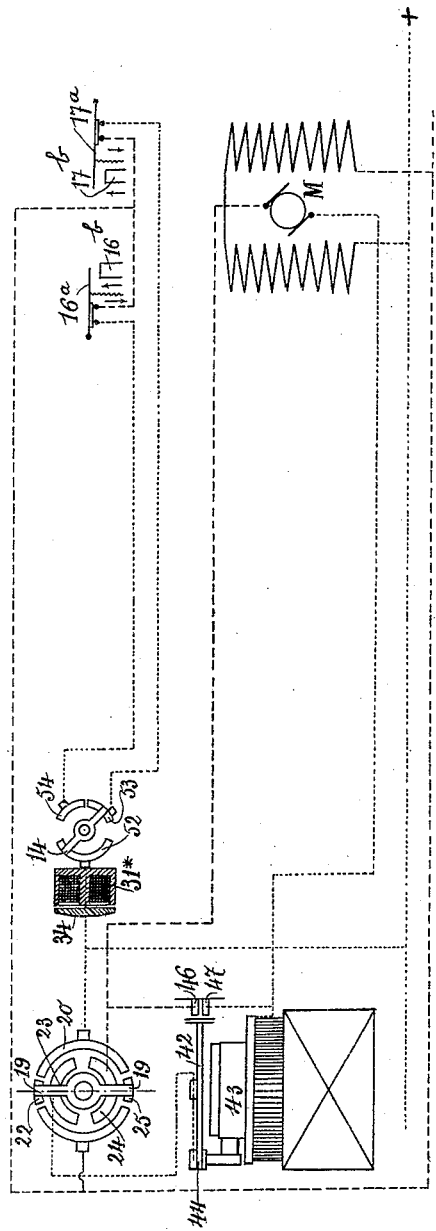

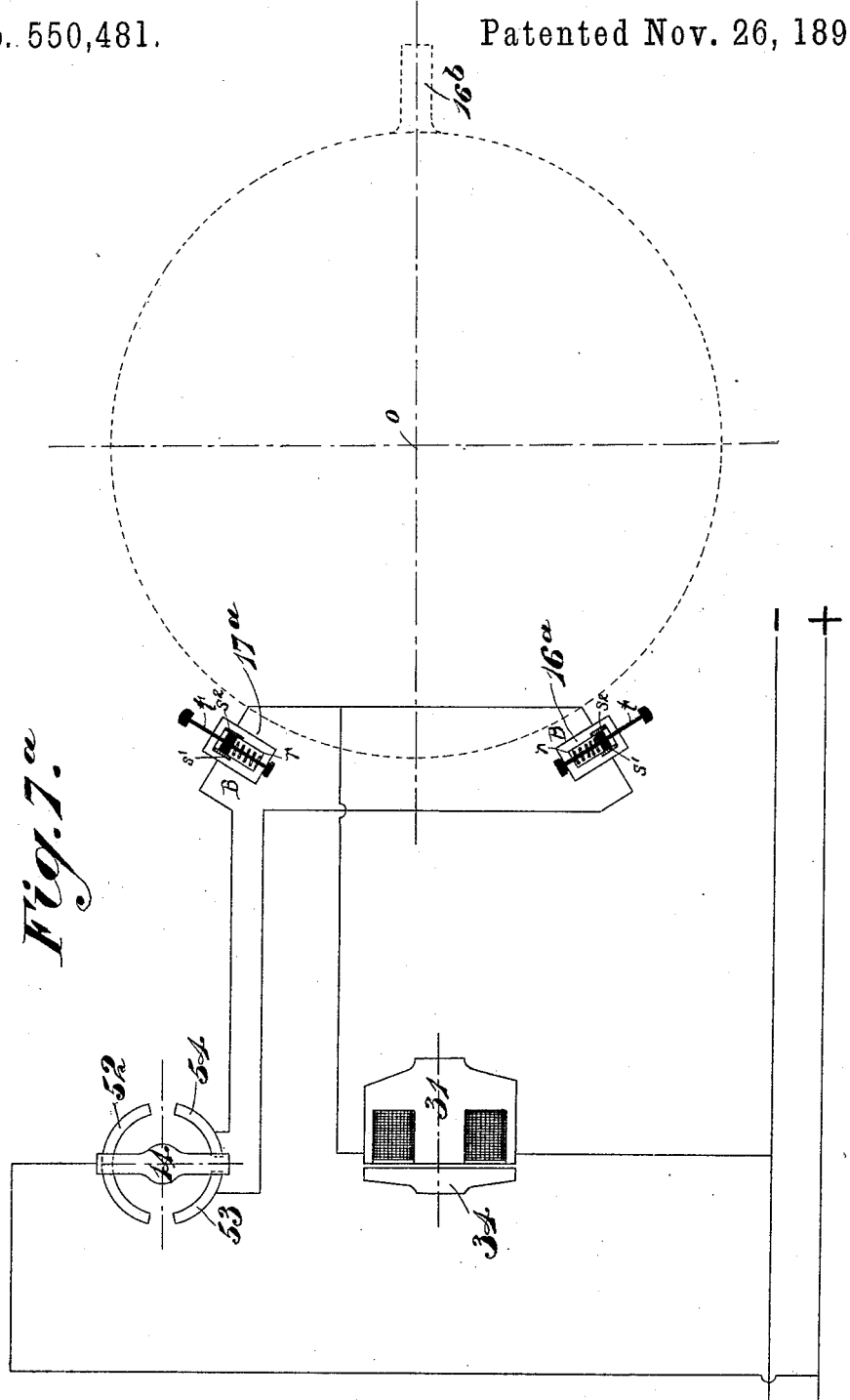

(No Model.) 7 Sheets—Sheet 6.
J. B. G. A. CANET & A. HILLAIRET.
CONTROLLING APPARATUS FOR ELECTROMOTORS.
No. 550,481. Patented Nov. 26, 1895.
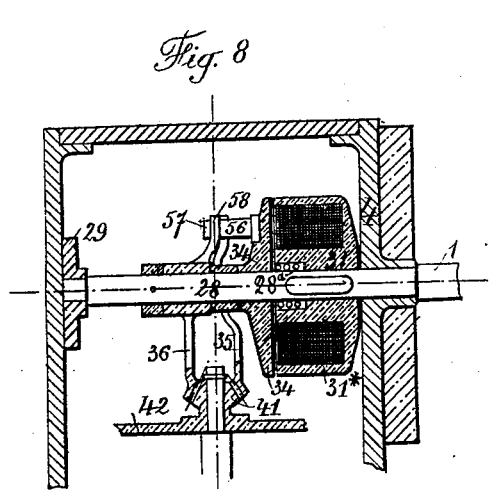
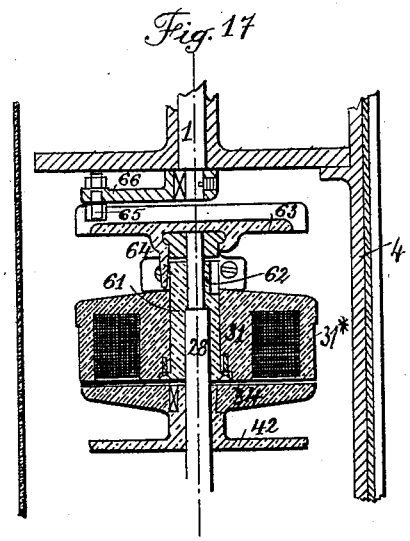
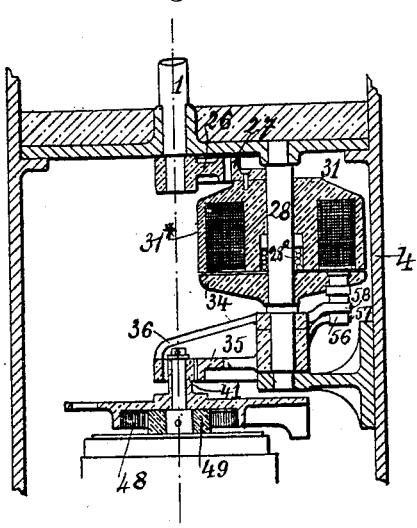
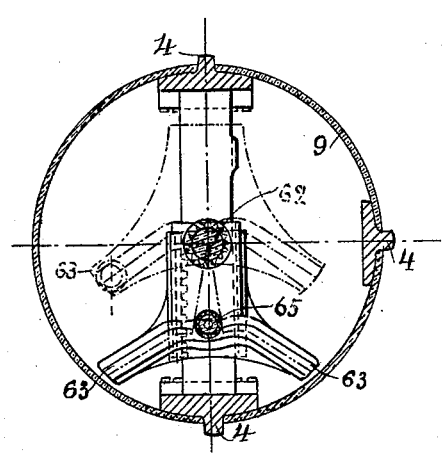
Witnesses.
C. M. Werle
Hubert Peck
Inventors
J. B. G. A. Canet
André Hillairet (No Model.) 7 Sheets—Sheet 7.

J. B. G. A. CANET & A. HILLAIRET.
CONTROLLING APPARATUS FOR ELECTROMOTORS.

No. 550,481. Patented Nov. 26, 1895.

Witnesses
E. C. Duffy
Hubert Peck

Inventors
J. B. G. A. Canet
André Hillairet
per O. E. Duffy
Attorney

UNITED STATES PATENT OFFICE.

JEAN BAPTISTE GUSTAVE ADOLPHE CANET AND ANDRÉ HILLAIRET, OF PARIS, FRANCE.

CONTROLLING APPARATUS FOR ELECTROMOTORS.

SPECIFICATION forming part of Letters Patent No. 550,481, dated November 26, 1895.

Application filed August 28, 1894. Serial No. 521,554. (No model.) Patented in France November 28, 1893, No. 234,373, and in England July 30, 1894, No. 14,602.

*To all whom it may concern:*

Be it known that we, JEAN BAPTISTE GUSTAVE ADOLPHE CANET, residing at 3 Rue Vignon, and ANDRÉ HILLAIRET, residing at 22 Rue Vicq d'Azir, Paris, in the Republic of France, citizens of the Republic of France, have invented Improvements in Controlling Apparatus for Electromotors, (for which we have obtained Letters Patent in Great Britain, No. 14,602, dated July 30, 1894, and in France, No. 234,373, dated November 28, 1893, and patent of addition, dated February 14, 1894,) of which the following is a specification.

This invention relates to means for controlling the working of electromotors used for operating bodies or machines—such as elevators, winches, traveling bridges, ships, and other turrets, and tramway and railway vehicles—the movements of which are limited in extent and require to be reversed from time to time. In such cases it is desirable, both as regards safety and in order to prevent damage to the stops used, to limit the movement of the aforesaid bodies or machines that the electromotor operating the same shall be stopped automatically when the body or machine arrives at the said stops, and this invention relates to means whereby this result can be effected in a simple, convenient, and effective manner.

Figure 6:
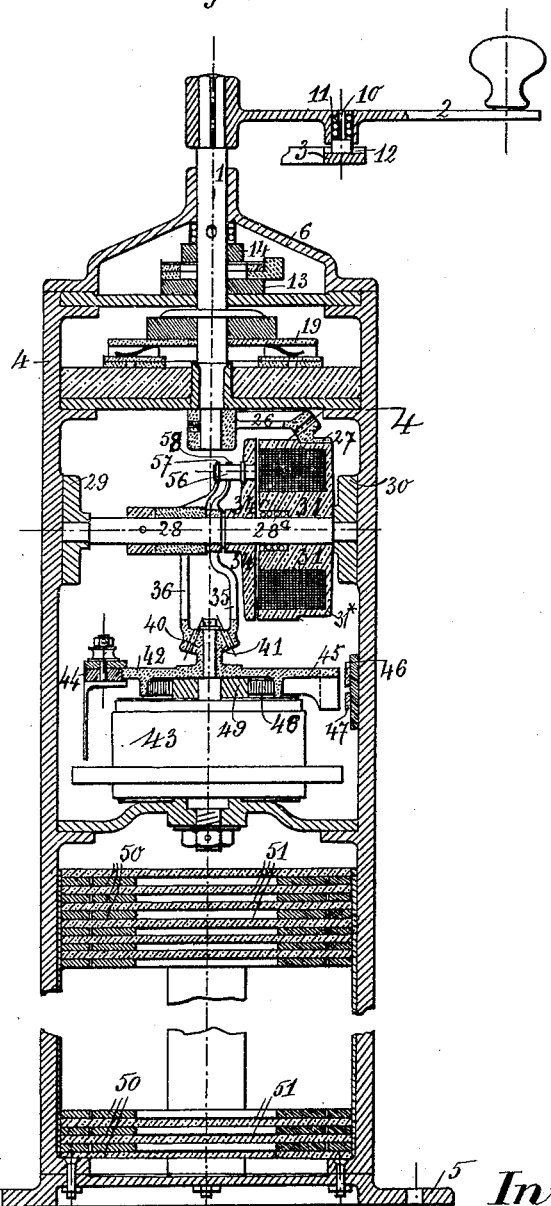

In the accompanying drawings, Figures 1 to 5, inclusive, illustrate one construction of apparatus according to our invention, Fig. 1 being a central vertical section, partly in elevation; Fig. 2, a horizontal section on the line II II of Fig. 1; Fig. 3, a section on the line III III of Fig. 1; Fig. 4, a section on the line IV IV of Fig. 1, and Fig 5 a diagram showing the electrical connections of the apparatus. Figs. 6 and 7 illustrate a modified construction, Fig. 6 being a similar view to Fig. 1, and Fig. 7 a diagram showing the electrical connections. Fig. 7ª is a diagram representing a body in operative relation to the electric stops and showing one form of these stops in detail. Figs. 8 to 18, inclusive, illustrate further modifications, hereinafter more fully explained.

Referring to Figs. 1 to 5, inclusive, the controlling apparatus comprises the following parts: an operating-shaft 1, on the upper end of which is a handle 2, capable of being moved to the right and to the left over a fixed arc 3, a switch for electrically connecting the stops as required, (hereinafter called the "stop-switch,") a switch for reversing the direction of motion of the electromotor and hereinafter called the "reversing-switch," transmitting-sectors, an intermediate horizontal shaft, a double electromagnetic clutch comprising two sleeves loose on the intermediate shaft and carrying two electromagnets, a movable double armature keyed on the shaft and coupling-sectors fixed on the sleeves, a shaft on which is mounted a brush-carrier and which is provided with a bevel-pinion constantly in gear with the coupling-sectors, a brush-carrier proper or operating-arm carrying the brushes and the short-circuiting contact-pieces, a spring for returning the brushes and their connection to their normal positions, a commutator, and a rheostat composed of flat coils of copper wire placed one above the other.

The casing of the apparatus, which is of conducting material, is constructed of three cast-iron standards 4, which are suitably stayed together, are fixed at their lower ends to a cast-iron base-plate 5, and carry at their upper ends a cover 6. This cover, through which extends the operating-shaft 1, is provided with two sight-holes 7, closed by screw-plugs 8. To the standards 4 three bent metal sheets 9 are secured by a row of screws or by other suitable means, so as to form a cylindrical casing. One of these sheets is made semicylindrical, so as to allow of the removal of the coils of the rheostat in case of damage without its being necessary to remove the upper parts of the apparatus.

The operating-shaft 1 ends in a squared portion, on which the handle 2 is fitted. The shaft 1 is guided partly by the cover 6 and partly by a collar (not shown) carrying an arc 3, over which the handle 2 moves. In order to regulate its movement, the handle 2 carries a pin or projection 10, which is forced by a helical spring 11 to enter notches 12 in the arc 3. The object of these notches is to enable the handle 2 to be kept at a zero-mark and also to cause the handle, when operated, to make a short stoppage when the pin or projection 10 meets the left-hand and right-hand stops—that is to say, at the precise moment when the armature comes into contact with the sleeve of the electromagnetic clutch.

The stop-switch is an ordinary switch consisting of four fixed contact-pieces 15, 16, 17, and 18, Fig. 2, mounted on a base-piece 13, of insulating material, such as marble, and of a movable contact 14, keyed or otherwise secured on the operating-shaft 1. The contact-piece 15 is in constant electrical connection with the entering terminal of a shunt-circuit from the main circuit and is of such an extent as to remain always in contact with the movable contact 14 during the whole range of its movement. The contact-piece 18 is arranged diametrically opposite to the contact-piece 15 and is a neutral or dummy contact-piece for enabling the shunt-circuit to be broken when the operating-handle 2 is at zero. The contact-pieces 16 and 17, which are arranged on the right and left of the neutral contact-piece, are connected, respectively, to the right-hand stop $16^a$, Fig. 5, through the electromagnet 31 of the double-acting clutch and to the left-hand stop $17^a$, Fig. 5, through the other electromagnet 32 of the said clutch. This arrangement enables a portion of the main current to be sent into the stop and the coupling-sleeve on that side to which the handle 2 is moving, and thus to effect the movement of the part to be operated, as will be hereinafter more fully described.

The reversing-switch is similar to the stop-switch and is located immediately under the latter. It consists, Fig. 5, of a movable contact 19, keyed on the operating-shaft 1, and of six fixed contact-pieces 20, 21, 22, 23, 24, and 25. Two of the fixed contact-pieces—namely, 20 and 21—are in constant electrical connection with the entering terminals of the generator-circuit; two—namely, 23 and 24— are electrically connected to the brushes of the electromotor M, Fig. 5, one of them 23 through the commutator and the rheostat, and the remaining two—namely, 22 and 25— are unconnected and constitute neutral or dummy contacts corresponding to the zero position of the handle 2. Whatever may be the position of the movable contact 19 it is always in contact with the two second-mentioned contact-pieces 23 and 24, and as it moves either to the right hand or to the left it connects them alternately with one or the other brush of the motor M. In this manner the circuit is always broken at the zero position of the handle 2, and the entering terminal of the current for the electromotor M is reversed, according to the direction of movement of the movable contact 19.

The transmitting-sectors 26 and 27 are formed of two portions of gun-metal bevel-wheels. One sector 26 is keyed on the vertical operating-shaft 1 and the other 27 is keyed on the horizontal intermediate shaft 28. The shaft is thus directly operated by the movement of the lever 2.

The horizontal intermediate shaft 28 is carried in two bearings 29 and 30, fixed to two of the standards 4. On the shaft 28 there are arranged, in addition to the transmitting-sector 27, the two electromagnets 31 and 32 and the double armature 33 34 of the double-acting magnetic clutch.

The magnetic clutch comprises the two electromagnets 31 and 32, which correspond to the two directions of rotation of the electromotor M and are inclosed in cylindrical casings $31^*$ $32^*$, mounted loosely on the shaft 28. The coils of these electromagnets are contained in an annular space situate between the core proper and the casing $31^*$ or $32^*$, which with the corresponding armature closes the magnetic circuit of the electromagnet. The circuits of the electromagnets comprise the stops $16^a$ and $17^a$ and the stop-switch and constitute a shunt from the main circuit. To each of the casings $31^*$ $32^*$ there is fixed a gun-metal bevel coupling-sector 35 or 36, respectively. Between the two electromagnets 31 and 32 there is situated the movable double armature 33 34, which is formed in one with a sleeve 37, keyed on the horizontal intermediate shaft 28. Each of the disks 33 and 34 forming an armature is provided with a tooth 38, Fig. 4, which at the outset of the operation engages in a recess 39, formed in the casing of the corresponding electromagnet 31 or 32 and serves to insure the operation of the said electromagnet and consequently of its coupling-sector 35 or 36. The distance existing between the tooth and its bearing in the recess at the position of zero is such as to permit of the establishment of the magnetic field before the stop engages in the recess.

The brush-carrying shaft 40 is non-rotatable and is fixed with its axis in line with that of the vertical operating-shaft 1. A gun-metal sleeve 41 is mounted loosely on the shaft 40 and carries an operating-arm 42. The end of the sleeve 41 is provided with teeth, so as to form a bevel-pinion gearing with both of the coupling-sectors 35 and 36.

The brush-carrier consists of an operating-arm on one end of which is mounted a holder 44, carrying brushes that are constantly in contact with the periphery of the commutator-like collector 43. The arm 42 carries, also, a contact-piece 45, which short-circuits the induction-coils of the electromotor M when the handle 2 is brought back to zero. The short-circuiting is effected by means of two suitably-arranged rubbing-contacts 46 and 47, each of which is electrically connected to one terminal of the electromotor M, and both of which are electrically connected by the contact-piece 45 at the zero position of the handle 2. The returning-spring 48 is a spiral spring, one of the ends of which is attached to the non-rotatable shaft 40 by means of a ring 49, while the other end is attached to the brush-carrier 42. The object of the spring 48 is to bring the brushes back to the neutral contact-piece of the commutator when the circuit of the magnetic coupling is automatically broken by the action on one of the stops 16ª and 17ª of the part operated by the electromotor M.

The collector 43 is constructed similarly to the commutator of a dynamo, and its contact-pieces are connected to the several coils constituting the resistances 50 of the rheostat. In the middle is the neutral contact-piece, which is separated from the others by insulating material.

The resistances 50 are placed at the lower part of the casing of the apparatus and are formed of a series of flat coils of copper wire placed one above another. The entering and exit wires of these coils are connected to the contact-pieces of the commutator, by means of which they are coupled up in series. The successive coils constituting the resistances are separated by disks 51 of insulating material—for example, wood.

The operation of the apparatus is as follows: When current is sent into the motor from the delivering-switchboard of the generating dynamos and the handle 2 is in its zero position, there is, on account of the arrangement of the apparatus, no circuit made. By moving the handle 2 in one or the other direction the vertical shaft 1 is caused to operate the movable part 14 of the stop-switch in such a manner as to send the current into the electromagnet of the magnetic clutch that corresponds to the direction of the motion. At the same time the movable contact-piece of the reversing-switch moves in such a manner as to send the current into the motor in the direction desired. By continuing to move the lever 2 the horizontal intermediate shaft 28 is caused to rotate by means of the transmitting-sectors 26 and 27, and the movable armature 33 and 34, becoming attracted on account of the passage of the current through, say, the electromagnet 31 corresponding to the position of the lever 2, the said magnet and its casing are compelled to move toward the armature 33 34, so that the tooth 38 is caused to engage in the recess 39, formed in the said casing. The lever 2 now rotates the coupling-sector 35, and consequently the pinion 41, fixed on the brush-carrier 42. The brush-carrier is thus moved, and the brushes leave the neutral contact-piece and come into contact with the active contact-pieces of the collector 43. The short-circuiting now ceases and current is sent into the electromotor M at a low potential through the rheostat. This potential increases with the movement of the lever 2 until the brush arrives at the contact-piece which corresponds with the force required for starting. At this moment the electromotor M starts, and its velocity of rotation will go on increasing until the lever 2 has arrived at the limit corresponding to the maximum velocity. To each position of the lever 2 there corresponds a definite velocity, so that by the arrangement described the velocity of the electromotor can be made to assume various values between the maximum and minimum limits. When the lever 2 is moved back to zero in order to stop the electromotor, the motor has its current cut off and becomes short-circuited, which insures its instantaneous stoppage. If when the motor has been started with a certain velocity the lever 2 be let go in the position corresponding to that speed, the stop 16ᵇ or 17ᵇ, Fig. 5, on the body or machine operated by the electromotor M will act at the limits of the travel upon the electric contact-stops 16ª or 17ª, respectively, and the current will be cut off automatically from the electromagnet 31 or 32, whereupon the corresponding electromagnet will be moved away from the armature 33 34 by a helical spring 28ª. At the same time the electromotor will be short-circuited and stop instantaneously.

Figs. 6 and 7 illustrate a modification of the hereinbefore-described apparatus, which differs from the latter, in that the connection between the operating-shaft 1 and brush-carrier 42 is effected by a single magnetic clutch 31, acting continuously instead of by two clutches alternately in gear with their circuits broken every time the handle 2 moves into the zero position. The general arrangement of the casing is unaltered; also, the reversing-switch, the brush-carrier, the commutator, and the rheostat do not differ in any way from those hereinbefore described. The modifications relate only to the stop-switch, the transmitting-sectors, the intermediate shaft, and the magnetic clutch. The stop-switch is an ordinary switch provided with three fixed contact-pieces 52, 53, and 54, Fig. 7, mounted on a marble or other insulating base, with a movable contact 14, keyed or otherwise suitably fixed on the operating-shaft 1. The contact-piece 52 is in constant electrical connection with the entering terminal of a shunt-circuit from the main circuit and is of sufficient extent to remain always in contact with the movable contact 14 over the entire range of movement of the said movable contact. The fixed contact-pieces 53 and 54 are arranged symmetrically to each other with regard to the zero position of the movable contact 14 and correspond to the range of movement of the handle 2 in its two directions of movement. Their two ends remote from the contact piece 52 are sufficiently near to be electrically connected by the movable part 14 when the latter is at zero. Each of the contact-pieces 53 and 54 is connected with the circuit of one of the electrical stops 16ª and 17ª in such a manner that the return portion of the circuit of the clutch is formed through both of the electrical stops at the same time when the handle 2 is in the zero position and by one stop only—namely, the one corresponding to the direction of the movement—when the movable contact 14 is turned. Thus arranged the stop-switch never breaks the circuit of the electromagnetic clutch and consequently can never in any position whatever cause the slightest sparking.

The transmitting-sectors 26 and 27 are formed by two portions of gun-metal bevel-wheels, one 26 of which is keyed on the vertical operating-shaft and the other 27 is fixed by screws on the casing of the electromagnet 31.

The intermediate horizontal shaft 28 is carried in two bearings 29 and 30, fixed to the standards 4 of the casing. On the shaft 28 are loosely mounted the electromagnet 31, its armature 34, and the two coupling-sectors 35 and 36.

The magnetic clutch, which serves to couple the operating-shaft 1 to the brush-carrier 42, comprises the electromagnet 31, mounted loosely on the shaft 28. The coils of this electromagnet are contained in an annular space situate between the core proper and the outer portion of the shell or casing, as and for the purpose hereinbefore described with reference to the arrangement shown in Figs. 1 to 5, inclusive. The circuit of the electromagnet is a shunt from the main circuit and connects the stops $16^a$ and $17^a$ in parallel when the switch for the stops is in the zero position. In front of the magnet-core and also mounted loosely on the intermediate shaft 28 is the armature 34 of the electromagnet 31. This armature 34 carries parallel to the shaft 28 a pin 56, which is embraced with a slight amount of play at each side by two tailpieces 57 and 58 on the two coupling-sectors 35 and 36. These sectors are loose on the shaft 28 and constantly engage in the coupling-pinion 41 in such a manner that when the apparatus is in operation only one sector is transmitting motion at any time. The other sector is moved in the opposite direction by the pinion 41 without actuating any mechanism and is brought back into its initial or zero position when the operating-handle 2 is returned to zero. The two sectors 35 and 36 are always symmetrically situated with regard to a vertical plane containing their axis in whatever position the handle 2 may be. The armature 34 carries on its flat surface a tooth adapted to engage in a recess formed in the shell or casing of the magnet 31 in the manner described with reference to the construction shown in Figs. 1 to 4.

In the zero position the armature is kept away from the shell by a helical spring $28^a$, so that the aforesaid tooth is not engaged in its recess and the armature 34 is independent of the shell or casing of the magnet 31. In this modified arrangement when the current is turned on to the electromotor by means of the switchboard of the generating-dynamo and the lever 2 is in its zero position, then, in consequence of the arrangements hereinbefore described, no current will pass except through the electromagnet 31, which thus causes the shaft 1 to become connected with the brush-carrier 42. On moving the handle 2 in one or the other direction the motion of the vertical shaft 1 is imparted to the movable part 14 of the stop-switch in such a manner as to allow of the return of the current from the electromagnet 31 only through the stop $16^a$ or $17^a$ corresponding to the direction of the motion. At the same time the movable contact-piece 19 of the reversing-switch will move so as to send the current into the motor M in the desired direction. The extent of movement of the handle 2 that is sufficient to effect this double operation corresponds exactly to the amount of play left between the pin 56 of the armature 34 of the electromagnet 31 and the tailpieces 57 and 58 of the two sectors 35 and 36. Consequently the induced or armature coils of the motor M will still be short-circuited and no motion of the motor will be produced. On continuing to operate the handle 2 the brush-carrier 42 will be operated by the coupling-sectors 35 and 36 and the pinion 41. The brushes are then moved away from the neutral contact-piece of the rheostat and come into contact with the active contact-pieces thereof, the short-circuiting ceases, and the current is sent into the motor M at a low potential. The potential increases with the extent of travel of the handle 2 until the brushes arrive at the contact-piece corresponding to the potential requisite for starting. At this moment the motor M starts and its velocity of rotation will gradually increase as the handle 2 moves toward its extreme position, which corresponds to the maximum velocity. To every position of the handle 2 there corresponds, as before, a definite velocity, which may thus be caused to assume all values comprised between zero and the predetermined maximum.

When the handle 2 is moved back toward zero, the returning-spring 48 causes the corresponding sector 35 or 36 and the brushes to move back through all the positions assumed during the first movement. The velocity of the motor M is thus caused to diminish gradually until the motor stops altogether. At zero the short-circuiting is again produced. On continuing the motion of the handle 2 the stop-switch and the reversing-switch change the stop $16^a$ or $17^a$ in connection therewith and the direction of the connections, respectively. The second coupling-sector 35 or 36, as the case may be, then in its turn drives the pinion 41, and consequently also the brush-carrier 42, until the electromotor M assumes a rotary movement in the opposite direction to that of the previous movement. By moving the handle 2 very rapidly alternately to each side of zero the motor M may be caused to make successive fractional revolutions of any desired small extent. Furthermore, supposing the motor to be rotating at any given velocity and the lever 2 to be left in the position corresponding to that speed one of the stops $16^b$ or $17^b$ of the part of the body or machine operated by the motor will act at the extreme limit of the range of travel upon the corresponding electric stop 16ª or 17ª and the shunt-current will be cut off automatically. At the same time the motor will be short-circuited and stopped instantaneously. In order to start the motor anew, the handle 2 must first be brought to zero. In this position the movable contact 14 of the stop-switch will come into contact with the fixed contact-piece 53 or 54 corresponding to the other stop. The circuit is then closed and all is ready for motion in the opposite direction. Any false movement is impossible, because the coupling-circuit is remade only by the stop 16ª or 17ª that has not operated, and consequently only a return movement can be imparted to the moving part. Any reverse movement of the handle 2 would have the result of again breaking the coupling-circuit.

Fig. 7ª is a diagram representing, by way of example, apparatus of the kind described with reference to Figs. 6 and 7 in operative relation to a body provided with a single stop 16ᵇ, arranged to rotate about a center O. The electric stops 16ª and 17ª are fixed in position and are arranged in the path of the stop 16ᵇ and somewhat in advance of the mechanical stops. Each of the stops 16ª and 17ª consists of a cylinder B, of ebonite, in which fits a metallic piston fixed on a rod $t$. A spring $r$ tends to keep this piston at the front of the cylinder, where it electrically connects two portions $s'$ and $s^2$ of a ring, the ring portions $s'$ of the stops 16ª and 17ª being connected with the contact-pieces 53 and 54, respectively, of the stop-switch and both of the portions $s^2$ being connected with the electromagnetic clutch 31. From this it will be seen that if the motor M, Figs. 5 and 7, be rotating at any given velocity and the lever 2 be kept or left in the position corresponding to that velocity the stop 16ᵇ of the moving body will act at each end of its travel upon the rod $t$ of one of the stops 16ª and 17ª, forcing the corresponding piston back in its cylinder and thus breaking the communication between the corresponding ring portions $s'$ and $s^2$. The magnetic clutch will thus be deprived of current and the returning-spring 48 will bring the brush back upon the neutral contact-piece of the collector 43 and in doing so instantaneously short-circuit the motor. In Fig. 7ª the movable part 14 of the stop-switch is shown in its neutral position, from which, as hereinbefore stated, it is moved so as to be out of contact with one of the pieces 53 and 54 on starting the motor.

The modified arrangement illustrated in Fig. 8 differs from that shown in Fig. 6 only by the omission of the two toothed sectors 26 and 27. In this case the operating-shaft 1 of the reversing-switch is connected directly to or formed in one with the shaft 28, so that it is perpendicular to the axis of the rheostat. The mode of operation is the same as that of the arrangement just described.

In the modified arrangement illustrated in Fig. 9 the bevel-sectors 35 and 36 are replaced by spur-sectors having, respectively, internal and external teeth. The shaft 1 drives the shell of the electromagnet 31 by means of two spur-sectors 26 and 27. The mode of operation is the same as that described with reference to Figs. 6 and 7.

Figure 10:
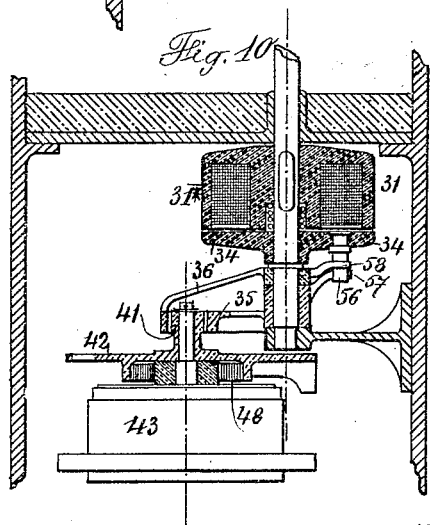

In the modified arrangement illustrated in Fig. 10 the two sectors 26 and 27 used in the previously-described arrangements are dispensed with and the casing of the electromagnet 31 is keyed directly on the shaft of the reversing-switch. The mode of operation of this arrangement is the same as that of the arrangements described with reference to Figs. 6 and 7.

In the arrangements illustrated in Figs. 6, 8, 9, and 10 when the operating-handle 2 is moved back into the zero position the spiral spring 48 returns the sectors 35 and 36 and the commutator-brushes to their initial positions. In order to be able to stop and reverse the electromotor by means of the handle 2 and without any action on the part of the electric stops 16ª and 17ª, notwithstanding the failure of the spiral spring 48, for instance, through the breakage of the same, the following arrangement may be employed. In the arrangement illustrated in Figs. 14, 15, and 16 the solid pin 56, Figs. 6, 8, and 10, is replaced by a tubular pin 56, in which is arranged a cylinder 55, pressed outward by a helical spring 55ª. The cylinder 55 carries at one end a cross-piece 59, adapted to slide in two slots formed in the pin 56. Each of the tailpieces of the sectors 35 and 36 is formed at its free end with a notch, in which one of the ends of the cross-piece 59 is adapted to engage, Fig. 16. When the handle 2 is in the zero or stopping position, the cylinder 55 is situate in front of the end of a stud 60, Fig. 15, which compresses the helical spring 55ª. On moving the handle 2 in any direction the casing of the magnet 31 and the armature will be rotated together with the cylinder 55. The end of the cylinder 55 thus escapes from the stud 60 and the helical spring 55ª pushes the cylinder 55 outward and causes one of the ends of the cross-piece 59 to enter the recess in the tailpiece situate on the side toward the direction of movement. On moving the handle 2 back into the stopping position the pin 56 draws back with it the tailpiece that was previously pushed forward and thereby returns the two sectors 35 and 36 and the brushes of the commutator into the stopping position.

Figure 11:
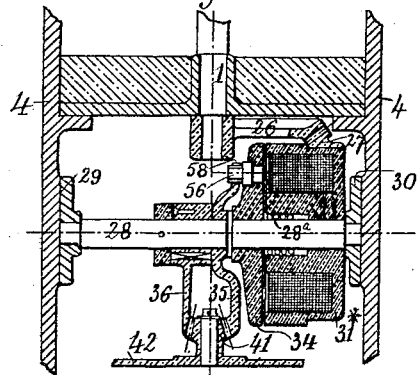
Figure 12:
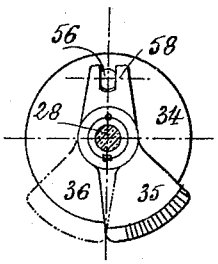
Figure 13:
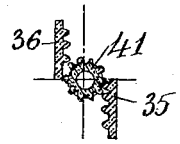
Figure 14:
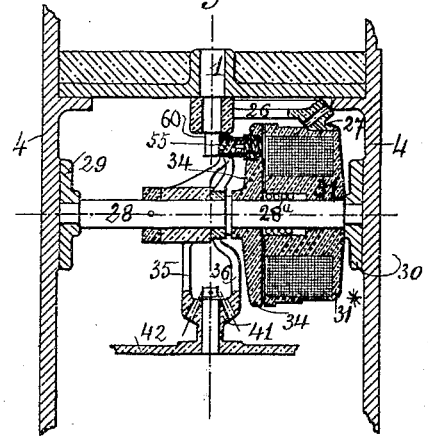
Figure 15:
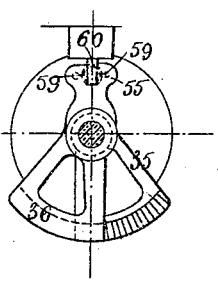
Figure 16:
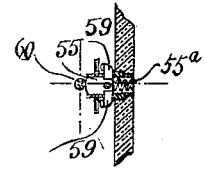

In the arrangement shown in Figs. 11, 12, and 13 the two bevel-sectors 35 and 36 form one piece, and the sector 36 only is provided with a tailpiece 58, which is formed with a notch in its end, in which engages the pin 56 of the casing of the magnet 31, Fig. 12. The sectors 35 and 36 are arranged relatively to each other, Fig. 12, in such a manner that the extreme tooth at the end of one sector and the extreme tooth at the adjacent end of the other sector shall, respectively, simply touch the pinion 41, Fig. 13, so that when, in consequence of the movement of the handle 2, the casing of the magnet 31 is rotated, together with the sectors 35 and 36, one of the latter will engage with the pinion 41 and the other will move away from the said pinion, so that when the handle is turned to the right or to the left one or the other of the sectors 35 or 36 will actuate the pinion 41, and as the two sectors engage alternately with the said pinion when moving in opposite directions the result will be that the pinion will be rotated in the same direction whether the handle be turned in one direction or the other from its zero position. In this arrangement the sectors 26 and 27 may be dispensed with, as in the arrangement shown in Fig. 8.

In all the arrangements hereinbefore described the spiral spring 48, which serves to return the brush-carrier into the stopping position, may be replaced by an equivalent device, such as by a coiled spring fixed to the end of a cord $a$, Fig. 1, wound on a drum or barrel fixed on the brush-carrier, or by a balance-weight working between two rollers or in a tube and attached to a cord wound on a barrel fixed to the brush-carrier of the commutator.

The modification illustrated in Figs. 17 and 18 has the same object as the modifications illustrated in Figs. 11 to 16, inclusive. In this arrangement the intermediate shaft 28, instead of being horizontal, is arranged vertically in line with the operating-shaft 1. The shaft 28 carries a metal sleeve 61, which ends in a pinion 62 at its upper part and on which is fixed the electromagnet 31. The armature 34 is keyed to or forms one piece with the brush-carrier 42 and is loose on the shaft 28. The connection between the operating-shaft 1 and the intermediate shaft 28 is effected by means of a slotted guide 63, provided at its lower part with a rack 64, gearing into the pinion 62. This slotted guide receives a to-and-fro movement by means of a roller 65, carried by an arm 66, keyed on the lower end of the operating-shaft 1. The armature 34, having been attracted by the electromagnet 31, and the operating-lever 2 being at zero, the various parts will be in the position shown in full lines in Fig. 18. If, then, the handle 2 be moved in one or the other direction, the lever 66 will be moved to a corresponding extent, but without causing any movement of the rack so long as the roller 65 rolls on that portion of the slide 63 that is coaxial with the operating-shaft 1. This period corresponds to the duration of the motion of the switches while changing the stop 16ª or 17ª, Figs. 5 and 7, for the time being electrically connected, and reversing the current in the electromotor M. At this moment the rolling motion of the roller 65 in the slide 63 causes the rack 64 to move and to rotate the pinion 62 and thus shift the brushes on the commutator 43. In returning the handle to zero the same phases are reproduced, but in a reverse manner, the motion of the slide 63 causing the return of the brush-carrier 42 independently of the returning-spring 48. Similarly, when the operating-handle 2 has passed beyond zero in order to change the direction of rotation of the electromotor M, the reversal takes place first, as in the previous case, and then the rack 64 by its longitudinal motion (which is the same as when the rotation of the handle 2 is in the reverse direction) carries with it the pinion 62 and the brush-carrier 42.

The apparatus hereinbefore described and its various modifications may be controlled directly by means of a hand-operated lever, as illustrated in the accompanying drawings, or from a distance by means of electromotors, solenoids, or other suitable electrical apparatus.

What we claim is—

1. Apparatus for starting, stopping and controlling electro-motors, comprising a stop switch, a reversing switch adapted to change the direction of current through an electromotor, an electro-magnetic clutch having its circuit controlled by said stop switch, electric stops adapted to be operated by the body or machine the motion of which is to be controlled and capable of breaking the circuit of said clutch, means for operating said switches and one part of said clutch, a rheostat adapted to be placed in circuit with said motor by said reversing switch and provided with a commutator, a brush-carrier connected with the rotary part of said clutch and carrying brushes arranged to travel in contact with said commutator, and means for returning the brush to its normal position when the circuit of said clutch is broken, substantially as herein described.

2. Apparatus for starting, stopping, and controlling electro-motors for operating bodies or machines of the kind hereinbefore specified, comprising an operating-shaft, a stop-switch and reversing switch controlled thereby, an electro-magnetic clutch consisting of two electro-magnets loose on a shaft connected with said operating-shaft and controlled by said stop-switch, a double armature fixed on the clutch shaft and adapted to be engaged with each of said electro-magnets in turn, and springs adapted to cause disengagement of said armature and each electro-magnet when the circuit thereof is broken, electric stops adapted to break the circuits of said electromagnets, a rheostat having a commutator one of the contact-pieces of which forms a neutral contact-piece, a brush-carrier operated from said clutch and provided with brushes arranged to travel on said commutator, and means adapted to transfer the brushes to the neutral contact-piece of the commutator when the circuit of the electro-magnetic clutch is automatically broken by either of said electric stops substantially as described.

3. Apparatus for starting, stopping and controlling electro-motors for operating bodies or machines of the kind hereinbefore specified, comprising an operating-shaft, a stop-switch and reversing-switch, controlled thereby, an electro-magnetic clutch, a rheostat provided with a commutator one of the contact-pieces of which forms a neutral contact-piece, and electric stops for breaking the circuit of said clutch, the electro-magnetic clutch consisting of a single electro-magnet that is in gear with the operating-shaft, is provided with a recess or recesses and is loose on a shaft, an armature loose on the same shaft as the electro-magnet and provided with a tooth or teeth adapted to engage in the recess or recesses of the electro-magnet, and a spring adapted to cause the said tooth or teeth to become disengaged from the said recess or recesses, when the circuit of the electro-magnet is broken, and the commutator being provided with brushes connected with the armature of the electro-magnetic clutch and with means adapted to transfer the said brushes to the neutral contact-piece of said commutator when the circuit of said electro-magnet is automatically broken by said electric stops substantially as described.

4. Apparatus for starting, stopping, and controlling electro-motors for operating bodies or machines of the kind hereinbefore specified, comprising an operating-shaft, a stop-switch having a movable contact-piece and four fixed contact-pieces, a reversing-switch having a movable contact-piece and six fixed contact-pieces, an electro-magnetic clutch controlled by said stop switch and actuated by said operating shaft, a rheostat provided with a commutator one of the contact-pieces of which forms a neutral contact-piece, and electric stops for breaking the circuit of said clutch, two of the fixed contact-pieces of the reversing-switch being constantly electrically connected with the entering terminals of the circuit from the generating dynamo, two of the others being electrically connected with the terminals of the electro-motor, and the remaining two being completely insulated and the commutator being provided with brushes connected with the electro-magnetic clutch and with a spring adapted to transfer the said brushes to the neutral contact-piece of the commutator when the circuit of the electro-magnetic clutch is automatically broken by either of said electric stops substantially as described.

5. Apparatus for starting, stopping, and controlling electro-motors for operating bodies or machines of the kind hereinbefore specified, comprising a stop-switch, a reversing-switch, an electro-magnetic clutch, a shaft for operating said switches, a rheostat provided with a commutator, which is furnished with brushes and one of the contact-pieces of which forms a neutral contact-piece, electric stops for breaking the circuit of said clutch, means adapted to transfer automatically said brushes to said neutral contact-piece when said circuit is broken by means of either of said stops, and connections between said shaft and said brushes adapted to transfer said brushes both to and from said neutral contact-piece, substantially as described.

6. Apparatus for starting, stopping, and controlling electro-motors for operating bodies or machines of the kind hereinbefore specified, comprising a stop-switch, a reversing-switch, an electro-magnetic clutch, a shaft for operating said switches, a rheostat provided with a commutator, which is furnished with brushes, and one of the contact-pieces of which forms a neutral contact-piece, electric stops for breaking the circuit of said clutch, means adapted to transfer automatically said brushes to said neutral contact-piece when said circuit is broken by means of either of said stops, and a connection between said clutch and said brushes comprising a pin secured to the armature of the said clutch, a pinion fixed to an arm on which said brushes are mounted, and two sectors gearing on opposite sides with said pinion and provided with a tail-piece adapted to be acted upon by said pin, substantially as described.

In testimony whereof we have signed our names to this specification in the presence of two subscribing witnesses.

JEAN BAPTISTE GUSTAVE ADOLPHE CANET.
ANDRÉ HILLAIRET.

Witnesses:
POLETNICH ERNEST CHARLES,
EMILY RUTGER.